US006700758B2

(12) United States Patent
Hashimoto et al.

(10) Patent No.: US 6,700,758 B2
(45) Date of Patent: Mar. 2, 2004

(54) MAGNETORESISTIVE EFFECT TYPE OF HEAD, MANUFACTURING METHOD OF MAGNETORESISTIVE EFFECT TYPE OF HEAD, AND INFORMATION REPRODUCING SYSTEM

(75) Inventors: Junichi Hashimoto, Kawasaki (JP); Michiaki Kanamine, Kawasaki (JP); Takahiro Imamura, Kawasaki (JP); Kenichi Aoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 10/007,888

(22) Filed: Nov. 13, 2001

(65) Prior Publication Data

US 2002/0101693 A1 Aug. 1, 2002

Related U.S. Application Data

(63) Continuation of application No. PCT/JP99/03670, filed on Jul. 7, 1999.

(51) Int. Cl.[7] .................................................. G11B 5/39
(52) U.S. Cl. .................................................. 360/324.12
(58) Field of Search .............................. 360/324, 324.1, 360/324.11, 324.12, 324.2

(56) References Cited

U.S. PATENT DOCUMENTS 6,134,091 A * 10/2000 Toki et al. ............. 360/324.11
6,469,879 B1 * 10/2002 Redon et al. ............ 360/324.2
6,542,342 B1 * 4/2003 Hayashi et al. .......... 360/324.2

FOREIGN PATENT DOCUMENTS

| JP | 04-161874 | 6/1992 |
| JP | 7-41706 | 7/1995 |
| JP | 11-016126 | 1/1999 |
| JP | 11-086237 | 3/1999 |
| WO | WO 01/04878 | 1/2001 |

* cited by examiner

Primary Examiner—William Klimowicz
(74) Attorney, Agent, or Firm—Greer, Burns & Crain, Ltd.

(57) ABSTRACT

A magnetoresistive head reproduces information recorded on a recording medium with high recording density, suppressing generation of Barkhausen noise. A magnetoresistive effect element in the head is a flat multi-layer film in which a free magnetic layer is set to a lowest layer. The head also includes a non-magnetic substrate, an insulating layer contacting a center portion of a lower surface of a substrate side of the free magnetic layer, and a pair of electrode layers. The electrode layers are formed with the insulating layer in between, contacting both edge portions of the free magnetic layer. The electrodes are formed with the same surface height as the surface height of the insulating layer. A pair of magnetic wall control layers suppress movement of a magnetic wall of the free magnetic layer.

4 Claims, 6 Drawing Sheets

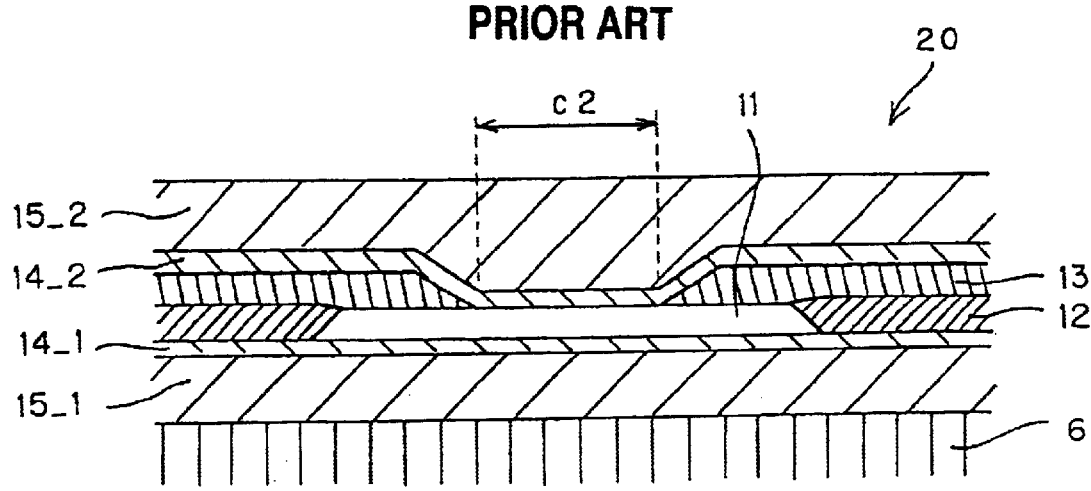
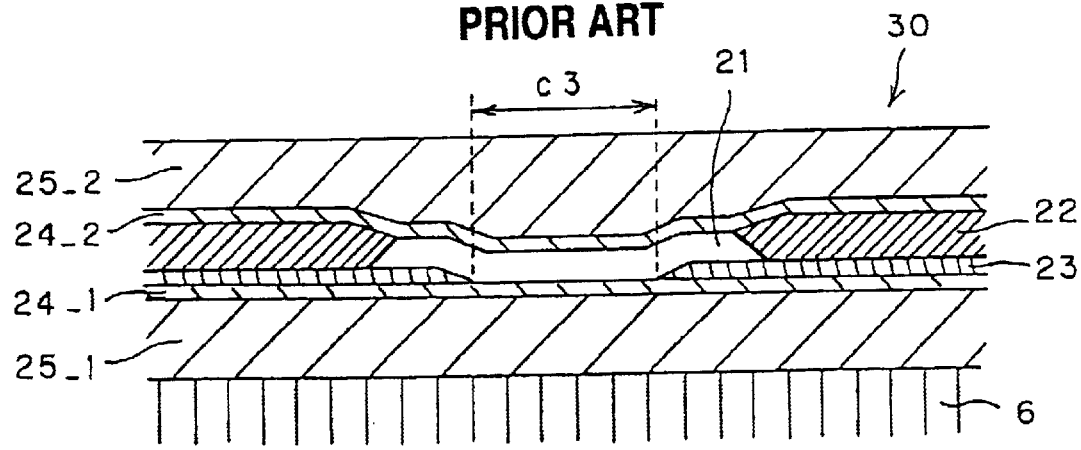

MAGNETORESISTIVE EFFECT TYPE OF HEAD, MANUFACTURING METHOD OF MAGNETORESISTIVE EFFECT TYPE OF HEAD, AND INFORMATION REPRODUCING SYSTEM

This is a continuation of International Application No. PCT/JP99/03670, filed Jul. 7, 1999, which was not published in English.

TECHNICAL FIELD

The present invention relates to a magnetoresistive effect type of head for detecting intensity of a magnetic field utilizing a resistive change according to the intensity of the magnetic field, a manufacturing method of the magnetoresistive effect type of head, and an information-reproducing system for reproducing information stored in a storage medium.

BACKGROUND ART

As computers have come into wide use, a lot of information is dealt routinely recently. Such information is stored in a storage medium with a large number of physical marks such as directions of magnetization or existence of pits, and is reproduced by an information-reproducing system for reading those marks to produce an electric reproduction signal.

As a storage medium for storing information in form of a direction of magnetization, for example, there is a magnetic disk. The magnetic disk is partitioned into a large number of circumference-like shaped tracks. Each track having a predetermined track width is further partitioned into bit lengths each having a predetermined length to form the minimum unit addressed as one-bit area. The magnetic disk is made of a magnetic material in its surface and is independently magnetized for each one-bit area to store a bit of information in the respective one-bit area in accordance with a direction of magnetization of the one-bit area. A hard disk drive, which is an information-reproducing system for reproducing information stored in the magnetic disk, has a magnetic head for detecting an external magnetic field for reproduction. This magnetic head for reproduction is disposed so as to be close to or in contact with the respective one-bit area of the magnetic disk and detects a magnetic field generated in accordance with a state of the magnetization of the one-bit areas, so that electric reproduction signals are created, and reproduces information stored in the magnetic disk.

Every year a storage density of information stored in a magnetic disk is enhanced, and as the storage density is enhanced, a size of the respective one-bit area of the magnetic disk is reduced. In order to detect a direction of the magnetization of the one-bit area small in size, there is needed a magnetic head for reproduction which is highly sensitive.

As the magnetic head for reproduction which is highly sensitive, there is known a magnetoresistive effect type of head (MR head) utilizing the magnetoresistive effect in which a resistance is varied in accordance with an external magnetic field. As a particularly highly sensitive one of the MR heads, there is known a spin valve type of MR head. The spin valve type of MR head is a multi-layer film including a magnetoresistive effect element comprising a free magnetic layer varying in a direction of magnetization in accordance with an external magnetic field, a non-magnetic metal layer, a fixed magnetic layer fixed in a direction of magnetization, and an antiferromagnetic layer for fixing a direction of magnetization of the fixed magnetic layer. In the spin valve type of MR head, a resistance is greatly varied in accordance with a relative angle between a direction of the fixed magnetic layer and a direction of the free magnetic layer. This magnetoresistive effect element is provided with an electrode layer through which a current conducts into the magnetoresistive effect element. In this spin valve type of MR head, a plane vertical to the multi-layer film serves as a receiving section to be sequentially close to or in contact with the respective one-bit area of the magnetic disk, so that the spin valve type of MR head receives a magnetic field generated from magnetization of the one-bit area to create an electric reproduction signal utilizing a variation of a resistance according to the received magnetic field.

The free magnetic layer of the multi-layer film is easy to involve a magnetic wall on edge portions or the like. When the magnetic wall moves owing to a variation of the magnetic field from the exterior, Barkhausen noise is generated on the reproduction signal. In order to suppress the generation of Barkhausen noise, a magnetic wall control layer made of a soft magnetic material and the like is disposed in form of a part of the multi-layer film. The magnetic wall control layer has a static magnetic field effect on the free magnetic layer and suppresses a movement of the magnetic wall of the free magnetic layer by the exchange coupling with the free magnetic layer.

With respect to such a spin valve type of MR head, one, in which the magnetoresistive effect element is formed in such a regular order that the free magnetic layer, the non-magnetic metal layer, the fixed magnetic layer, and the antiferromagnetic layer are laminated in the named order in turn from the bottom, is more satisfactory in orientation of magnetization of the laminated fixed magnetic layer and is more sensitive as compared with one, in which the magnetoresistive effect element is formed in the reverse order opposite to the regular order. For this reason, in many of the spin valve type of MR heads, the magnetoresistive effect element is formed in the regular order, and an electrode layer is laminated on the antiferromagnetic layer which is the top layer of the magnetoresistive effect element.

However, since the antiferromagnetic layer is large in specific resistance, laminating the electrode layer on the antiferromagnetic layer makes it difficult to conduct a current flowing from the electrode layer to the free magnetic layer, the non-magnetic metal layer and the fixed magnetic layer of the magnetoresistive effect element, which are directly involved in the detection of the magnetic field. Thus, there is considered a spin valve type of MR head in which in order to effectively conduct a current from the electrode layer to those layers, the electrode layer is disposed below the magnetoresistive effect element to improve sensitivity.

However, such a spin valve type of MR head, in which the electrode layer is disposed below the magnetoresistive effect element, is associated with a problem that the above-mentioned Barkhausen noise will be easily generated.

DISCLOSURE OF THE INVENTION

In view of the foregoing, it is an object of the present invention to provide a spin valve type of magnetoresistive effect type of head for preferably reproducing information recorded on a recording medium with high recording density suppressing generation of Barkhausen noise, a manufacturing method of the magnetoresistive effect type of head, and an information-reproducing system.

To achieve the above-mentioned object, the present invention provides a magnetoresistive effect type of head having a magnetoresistive effect element offering a resistive change according to intensity of an external magnetic field, for detecting a magnitude of a resistance of the magnetoresistive effect element to detect intensity of a magnetic field, wherein said magnetoresistive effect element consists of a flat multi-layer film in which a free magnetic layer changing in a direction of a magnetization in accordance with the external magnetic field is set up to a lowest layer, and said magnetoresistive effect type of head comprises:
a non-magnetic substrate;
an insulating layer contacting with-a center portion of a lower surface at a substrate side of said free magnetic layer;
a pair of electrode layers for conducting a current through said magnetoresistive effect element, said pair of electrode layers being formed at a position interposing said insulating layer therebetween contacting both edge portions of the lower surface at the substrate side of said free magnetic layer, and being formed with a same surface height as a surface height of said insulating layer; and
a pair of magnetic wall control layers for suppressing a movement of a magnetic wall of said free magnetic layer, said pair of magnetic wall control layers being formed to extend interposing said magnetoresistive effect element therebetween.

As will be described later in the preferred embodiments, according to the magnetoresistive effect type of head, first, a pair of electrode layers contacts both edge portions of the lower surface at the substrate side of said free magnetic layer. Thus, an interval between the pair of electrode layers causes a width (a core width) of a sensing area for sensing the magnetic field to be defined with great accuracy, and thereby preferably reproducing information stored in the magnetic disk with high storage density. Further, according to the magnetoresistive effect type of head, the pair of electrode layers is formed at a position contacting both edge portions of the lower surface of said free magnetic layer. This feature makes it possible to efficiently conduct a current through the magnetoresistive effect element and thereby detecting a magnetic field with high sensitivity. Furthermore, according to the magnetoresistive effect type of head, while the free magnetic layer is located on the pair of electrode layers, the pair of electrode layers is formed at the position interposing the insulating layer and is formed with the same surface height as a height of a surface of the insulating layer. Thus, the free magnetic layer has no difference in level and maintains flatness extending over the whole surface of the free magnetic layer. This flatness causes a movement of the magnetic wall of the free magnetic layer to be effectively suppressed by the magnetic wall control layer. Accordingly, the magnetoresistive effect type of head may suppress generation of Barkhausen noise and detect a magnetic field.

In the magnetoresistive effect type of head according to the present invention as mentioned above, it is preferable that the insulating layer contacting with the center portion of the lower surface of said free magnetic layer is an insulating layer which further extends below said pair of electrode layers, and said insulating layer is formed in such a manner that thickness of a layer of a portion extending to the center portion of the lower surface of said free magnetic layer, of said insulating layer is thinner than thickness of a layer of a portion extending below said pair of electrode layers, of said insulating layer.

Generally, in order that information stored in the magnetic disk with high density is preferably reproduced, it is desired to achieve thinner layer of the insulating layer of the magnetic head.

According to the magnetoresistive effect type of head, the insulating layer is formed as mentioned above. Thus, the insulating layer portion, which contacts the center portion of the lower surface of said free magnetic layer, is provided in form of the thinner layer. The insulating layer portion has an effect on reproduction characteristics of information stored in the magnetic disk with high density. And thus, it is possible to effectively prevent leakage of a current from the electrode and the magnetoresistive effect element.

In the magnetoresistive effect type of head according to the present invention as mentioned above, it is preferable that said pair of electrode layers consists of a material including at least one of Gold Au and Copper Cu.

Since the Gold Au and Copper Cu are small in specific resistance, according to the magnetoresistive effect type of head, it is possible to achieve thinner layer of the electrode layer.

To achieve the above-mentioned object, the present invention provides a manufacturing method for a magnetoresistive effect type of head of manufacturing a magnetoresistive effect type of head having a magnetoresistive effect element offering a resistive change according to intensity of an external magnetic field, for detecting a magnitude of a resistance of the magnetoresistive effect element to detect intensity of a magnetic field, wherein said magnetoresistive effect element is a multi-layer film including a free magnetic layer changing in a direction of a magnetization in accordance with the external magnetic field is set up to a lowest layer, said manufacturing method for a magnetoresistive effect type of head comprises steps of:

forming a lower shield layer having a hill portion rising over a predetermined width in height;
forming on said lower shield layer an insulating layer thinner than height of said hill portion;
forming on said insulating layer an electrode layer consisting of a conductive material in which a surface height of a portion out of said hill portion is higher than a surface height of said hill portion;
providing a flatness in such a height that while said insulating layer appears on an upper surface of said hill portion, said electrode layer appears on a surface of a portion out of said hill portion;
forming the magnetoresistive effect element consisting of the multi-layer film in which the free magnetic layer changing in a direction of a magnetization in accordance with the external magnetic field is set up to the lowest layer in such a manner that the insulating layer appearing on the surface is in contact with the center portion of the lower surface of said free magnetic layer, and both the edge portions of the lower surface of said free magnetic layer contact a pair of electrode layers separated into a state interposing the insulating layer therebetween; and
forming a pair of magnetic wall control layers for suppressing a movement of a magnetic wall of said free magnetic layer, said pair of magnetic wall control layers being formed to extend interposing said magnetoresistive effect element therebetween.

According to the above-mentioned manufacturing method for a magnetoresistive effect type of head, similar to the magnetoresistive effect type of head as mentioned above, it is possible to manufacture a magnetoresistive effect type of head having a pair of electrode layers for conducting a current through said magnetoresistive effect element, said pair of electrode layers being formed at a position interposing said insulating layer therebetween contacting both edge portions of the lower surface at the substrate side of said free magnetic layer, and being formed with a same surface height as a surface height of said insulating layer.

To achieve the above-mentioned object, the present invention provides an information-reproducing system having a magnetic head disposed close to or in contact with a magnetic storage medium storing information by magnetization for detecting the magnetization of respective points of the magnetic storage medium, said information-reproducing system reproducing information according to the magnetization of respective points of the magnetic storage medium detected by said magnetic head, wherein said magnetoresistive effect element consists of a flat multi-layer film in which a free magnetic layer changing in a direction of a magnetization in accordance with the external magnetic field is set up to a lowest layer, and said magnetic head comprises:
a non-magnetic substrate;
an insulating layer contacting a center portion of a lower surface at a substrate side of said free magnetic layer;
a pair of electrode layers for conducting a current through said magnetoresistive effect element, said pair of electrode layers being formed at a position interposing said insulating layer therebetween contacting both edge portions of the lower surface at the substrate side of said free magnetic layer, and being formed with a same surface height as a surface height of said insulating layer; and
a pair of magnetic wall control layers extending interposing said magnetoresistive effect element therebetween.

According to the magnetic head of the information-reproducing system, similar to the above-mentioned magnetoresistive effect type of head, the pair of electrode layers is formed at a position contacting both edge portions of the lower surface of said free magnetic layer, and the free magnetic layer has no difference in level and maintains flatness extending over the whole surface of the free magnetic layer. Thus, according to the information-reproducing system, a magnetic field is detected with high sensitivity so that information stored in the magnetic disk with high recording density is preferably reproduced. And further, it is possible to suppress generation of Barkhausen noise when the magnetic field is detected.

As mentioned above, according to the present invention, it is possible to provide a magnetoresistive effect type of head for preferably reproducing information recorded on a recording medium with high recording density suppressing generation of Barkhausen noise, a manufacturing method of the magnetoresistive effect type of head, and an information-reproducing system.

BRIEF DESCRIPTION OF THE DRAWINGS

FIG. 4 is a sectional schematic representation of a first conventional magnetic head.

FIG. 5 is a sectional schematic representation of a second conventional magnetic head.

BEST MODE FOR CARRYING OUT THE INVENTION

Embodiments of the present invention will be described hereinafter.

Figure 1:
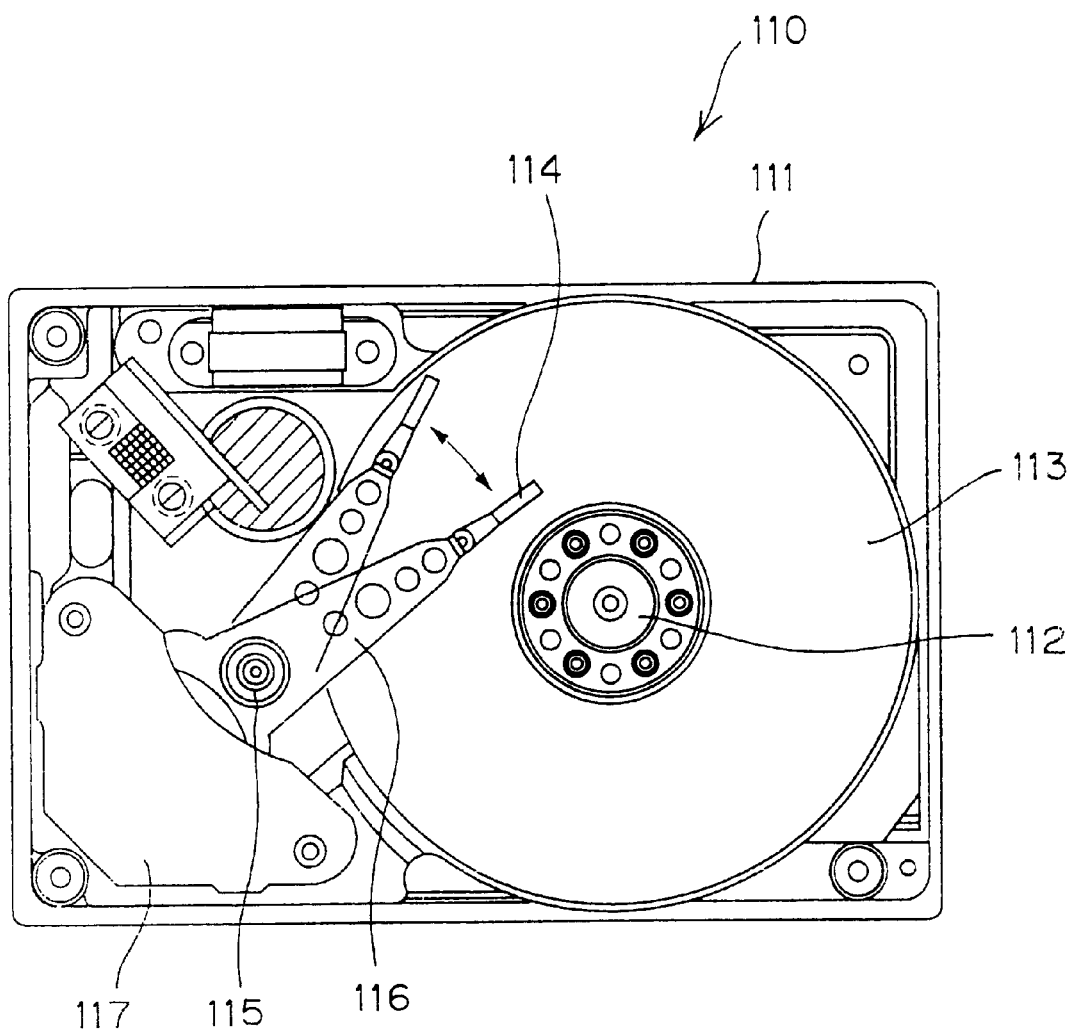
FIG. 1 is a view showing an internal structure of a hard disk drive of an embodiment of the present invention.

FIG. 1 is a view showing an internal structure of a hard disk drive of an embodiment of the present invention.

A hard disk drive (HDD) 110 corresponds to an information-reproducing system referred to in the present invention. A housing 111 of the HDD 110 accommodates a rotary shaft 112, a magnetic disk 113 mounted on the rotary shaft 112, a floating head slider 114 facing the magnetic disk 113, a rocking shaft 115, a carriage arm 116 on the top of which the floating head slider 114 is fixed and which rocks on the rocking shaft 115, and an actuator 117 for driving the carriage arm 116 on a rocking basis. To reproduce information stored in the magnetic disk 113, the carriage arm 116 is driven on a rocking basis by the actuator 117 constituted of a magnetic circuit, so that the floating head slider 114 is positioned at a desired track on the magnetic disk 113 now rotating. The floating head slider 114 is provided with a magnetic head 10, which is not shown in FIG. 1, corresponding to the magnetoresistive effect type of head referred to in the present invention. The magnetic head 10 sequentially comes close to one-bit areas on tracks of the magnetic disk 113 as the magnetic disk 113 rotates, so that information carried by magnetization of the respective one-bit area is derived by an electric reproduction signal created in accordance with a magnetic field generated from magnetization of the respective one-bit area. A cover (not illustrated) closes the internal space of the housing 111.

Next, there will be explained a structure of the magnetic head 10 of the present embodiment in conjunction with FIG. 2 and FIG. 3 as well.

Figure 2:
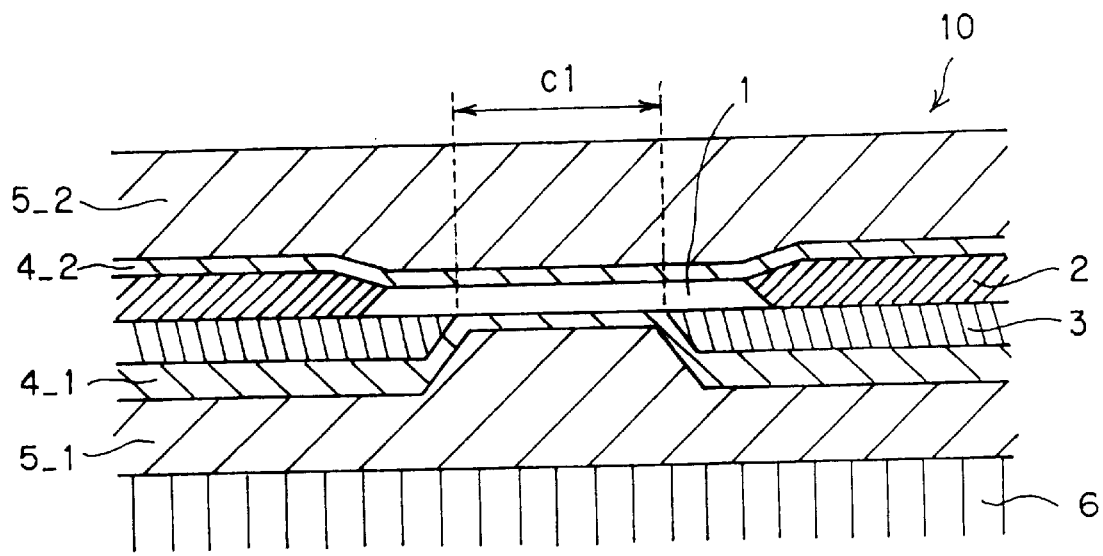
FIG. 2 is a sectional schematic representation of a magnetic head of an embodiment of the present invention.

FIG. 2 is a sectional schematic representation of a magnetic head of an embodiment of the present invention.

FIG. 2 is a sectional view of the magnetic head 10 looking from a direction perpendicular to a surface of the magnetic disk 113. The magnetic head 10 comprises a magnetoresistive effect element 1, magnetic wall control layers 2, electrode layers 3, a lower insulating layer 4_1, an upper insulating layer 4_2, a lower shield layer 5_1, an upper shield layer 5_2, and a substrate 6. First, there will be explained the magnetoresistive effect element 1, of the magnetic head 10, having a function of detecting a magnetic field, or a function of generating a reproduction signal according to a magnetic field. Structural elements other than the magnetoresistive effect element 1 have functions of assisting the function of the magnetoresistive effect element 1 as will be described later.

Figure 3:
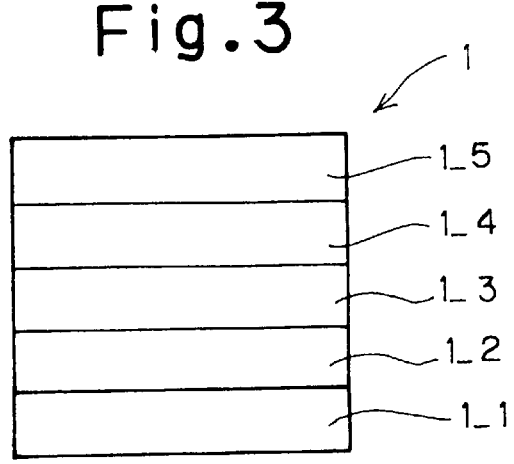
FIG. 3 is a sectional schematic representation of a magnetoresistive effect element.

FIG. 3 is a sectional schematic representation of a magnetoresistive effect element.

A magnetoresistive effect element 1 comprises a free magnetic layer 1_1 indicative of a soft magnetism in which a direction of magnetization rotates in accordance with a magnetic field from the exterior, a non-magnetic metal layer 1_2 laminated on the upper surface of the free magnetic layer 1_1, a fixed magnetic layer 1_3 laminated on the upper surface of the non-magnetic metal layer 1_2, which is magnetized in a predetermined fixed direction, and antiferromagnetic layer 1_4 laminated on the upper surface of the fixed magnetic layer 1_3, which fixes a direction of magnetization of the fixed magnetic layer 1_3 by exchange coupling with the fixed magnetic layer 1_3, in the named order from the bottom assuming that the direction of substrate 6 is lower. The magnetoresistive effect element 1 offers a huge magnetoresistive effect in which a resistance is greatly varied in accordance with a relative angle between a magnetization of the fixed magnetic layer 1_3 and a magnetization of the free magnetic layer 1_1.

The magnetoresistive effect element 1, as seen from FIG. 2, is flat extending over the whole surface of both the top surface and the bottom surface and has no difference in level. The free magnetic layer 1_1 is also flat similar to the magnetoresistive effect element 1. The magnetoresistive effect element 1 has a finite extent and is taper-shaped in both its edges.

The magnetic head 10 stands over against and comes close to the one-bit areas of the magnetic disk 113 on a plane parallel to a cross section shown in FIG. 2, so that a direction of the magnetization of the free magnetic layer 1_1 of the magnetoresistive effect element 1 is varied in accordance with a magnetic field generated from the magnetization of the one-bit area. A current conducts through the magnetoresistive effect element 1 via the electrode layer 3, so that an electric reproduction signal is generated in accordance with a resistive variation of the magnetoresistive effect element 1 caused by a variation of a direction of the free magnetic layer 1_1 to reproduce information carried by the magnetization of the respective one-bit area.

A pair of magnetic wall control layers 2 in right and left, which is made of a hard magnetic material, is disposed in such a manner that the magnetic wall control layers 2 are in contact with the right and left taper-shaped edges of the magnetoresistive effect element 1, respectively. The magnetic wall control layers 2 have an effect of static magnetic field on the free magnetic layer 1_1 and effectively suppress a movement of the magnetic wall of the free magnetic layer 1_1 through an exchange coupling. A suppression of a movement of the magnetic wall suppresses generation of Barkhausen noise in the reproduction signal generated in detection of a magnetic field by the magnetic head 10.

Incidentally, as a material of the magnetic wall control layer 2, it is acceptable that the antiferromagnetic material as well as the hard magnetic material is adopted. It is preferable that the magnetic wall control layer 2 consists of layers including at least one of a layer made of a hard magnetic material having coercive force 600 Oe or more in single layer and a layer made of the antiferromagnetic material offering the exchange magnetic field 600 Oe or more. As the hard magnetic material adopted for the magnetic wall control layer 2, it is preferable to adopt CoPt-base alloys that are large in coercive force and have uniaxial anisotropy, and it is easy to orient into a predetermined direction.

The lower insulating layer 4_1, which is made of an insulating material, is in contact with the center portion below the substrate 6 side of the free magnetic layer 1_1. Further, on both the edge portions below the substrate 6 side of the free magnetic layer 1_1, there are formed a pair of electrode layers 3 in right and left having the same surface height as that of the lower insulating layer 4_1, the pair of electrode layers 3 being in contact with both the edge portions and also in contact with the lower surface of the pair of magnetic wall control layers 2, and interposing the lower insulating layer 4_1 therebetween.

The pair of electrode layers 3 is formed in this manner. Thus, the magnetic head 10 including the electrode layers 3 has advantages as set forth below.

The pair of electrode layers 3 in the right and left is disposed under the magnetoresistive effect element 1, so that a current directly conducts through the free magnetic layer 1_1, the non-magnetic metal layer 1_2, and the fixed magnetic layer 1_3, not passing through the antiferromagnetic layer 1_4 that is relatively large in specific resistance, of the magnetoresistive effect element 1, and thereby obtaining a high output of the magnetic head 10.

Further, since the pair of electrode layers 3 in the right and left is in contact with the lower both ends of the free magnetic layer 1_1, an interval of the pair of electrode layers 3 in the right and left is narrower than a width of extent of the magnetoresistive effect element 1. The interval of the pair of electrode layers 3 in the right and left defines a core width c1 of a sense area detecting a magnetic field generated from a magnetization of the respective one-bit area of the magnetic disk 113 over against the magnetic disk 113, of the magnetoresistive effect element 1. The core width c1 has a size according to a width of a track of the magnetic disk 113. And it is required to define the core width c1 with great accuracy. Generally, the electrode layer can be formed through positioning with great accuracy in an in-plane direction. Accordingly, the magnetic head 10 has a core width defined with great accuracy, and detects a magnetic field generated from a magnetization of the respective one-bit area in a sense area having the core width of the magnetoresistive effect element 1, so that information, which is stored in the magnetic disk 113 with great accuracy, is satisfactorily reproduced.

A magnetic head having only the above-mentioned two properties or advantages is the conventional one. However, according to the magnetic head 10 of the present embodiment, the pair of electrode layers 3 in right and left has the same surface height as that of the lower insulating layer 4_1. Thus, the magnetic head 10 of the present embodiment has such a feature on the structure that the free magnetic layer 1_1 maintains flatness extending over the whole surface of the upper and lower surfaces of the free magnetic layer 1_1 and has no difference in level. The flatness of the free magnetic layer 1_1 causes a place easy to generate a magnetic wall on the free magnetic layer 1_1 to be only the neighborhood of the right and left taper-shaped edge portions in contact with the magnetic wall control layer 2 of the free magnetic layer 1_1, so that a movement of the magnetic wall of the free magnetic layer 1_1 is effectively suppressed by the magnetic wall control layers 2 extending while interposing the magnetoresistive effect element 1 therebetween. The magnetic head 10 of the present embodiment, as mentioned above, has a high sensitivity and is adapted for reproduction of information to be stored in the magnetic disk 113 with high density. And the magnetic head 10 generates a preferable reproducing signal, which is suppressed in Barkhausen noise by effectively suppressing a magnetic wall of the free magnetic layer 1_1.

The upper surface portion of the pair of electrode layers 3 can be subjected to a cleaning as will be described later. When the dust on the upper surface portion of the pair of electrode layers 3 is removed by such a cleaning, a contact resistance between the electrode layers 3 and the magnetoresistive effect element 1 becomes small, so that a preferable current conducts the electrode layers 3 and the magnetoresistive effect element 1.

As the material of the electrode layers 3, it is preferable that at least one of Au, Cu, Ta and Ru is included, and it is more preferable that at least one of Au and Cu is included. Since Au and Cu are small in specific resistance, the use of Au and Cu as the material of the electrode layers 3 makes it possible to achieve thinner layer of the electrode layers 3 of the magnetic head 10.

The lower insulating layer 4_1, as mentioned above, is in contact with the center portion below the substrate 6 side of the free magnetic layer 1_1, and is spread under the pair of electrode layers 3 in right and left. Further, the lower insulating layer 4_1 insulates, together with the upper insulating layer 4_2 formed on the upper surface of the magnetoresistive effect element 1 and a pair of magnetic wall control layers 2 in the right and the left, the magnetoresistive effect element 1, the magnetic wall control layer 2, the electrode layer 3 from the exterior. Further, the lower insulating layer 4_1 is formed in such a manner that thickness of a layer of a portion extending in the center of the lower layer of the free magnetic layer 1_1, of the lower insulating layer 4_1 is thinner than thickness of a layer of a portion extending under the pair of electrode layers 3 in the right and the left, of the lower insulating layer 4_1.

The lower shield layer 5_1 is formed to be in contact with under the lower insulating layer 4_1, and the upper shield layer 5_2 is formed on the upper insulating layer 4_2, so that a magnetic field other than that generated from a magnetization of a predetermined one-bit area of the magnetic disk 113 is shield. Since the lower shield layer 5_1 has a hill portion having a predetermined width, the lower insulating layer 4_1 is also a layer in which the center is high and both the edge portions are low because of the hill portion. The pair of electrode layers 3 in the right and the left is formed on the lower portions of both the edge portions of the lower insulating layer 4_1, so that there is implemented the above-mentioned structure that the surface height of the pair of electrode layers 3 in the right and the left is coincident with the surface height of the center of the lower insulating layer 4_1.

As mentioned above, the portion extending at the center of the lower layer of the free magnetic layer 1_1, of the lower insulating layer 4_1 achieves a thinner layer. Achieving a thinner layer causes a length of reproduction gap, that is, an interval between the lower shield layer 5_1 and the upper shield layer 5_2, of the magnetic head 10 to be reduced in accordance with the one-bit length. Thus, even if the magnetic disk 113 is one in which information is recorded with high density in the reduced one-bit length, the magnetic head 10 may satisfactorily reproduce the information. Further, as mentioned above, the portion extending at the center of the lower layer of the free magnetic layer 1_1, of the lower insulating layer 4_1 is thinner than thickness of a layer of a portion extending under the pair of electrode layers 3 in the right and the left, of the lower insulating layer 4_1. This feature makes it possible to ensure a sufficient insulation between the electrode layers 3 and the lower shield layer 5_1, while the magnetic head 10 maintains the function of satisfactorily reproducing the information recorded on the magnetic disk 113 with high density, and thereby effectively preventing leakage of a current from the electrode layers 3 and the magnetoresistive effect element 1.

Next, for the purpose of comparison there will be described the conventional magnetic heads.

FIG. 4 is a sectional schematic representation of a first conventional magnetic head.

A first conventional magnetic head 20 is one wherein a lower shield layer 15_1, which is flat extending over the whole surface of both the top surface and the bottom surface and has no difference in level, and a lower insulating layer 14_1, which is flat extending over the whole surface of both the top surface and the bottom surface and has no difference in level, are sequentially formed on a non-magnetic substrate 6; a magnetoresistive effect element 11 having a finite width in an in-plane direction of the lower insulating layer 14_1 is formed on the lower insulating layer 14_1 in such a manner that a free magnetic layer is placed under; a pair of magnetic wall control layers 12 in right and left interposing the magnetoresistive effect element 11 from both sides of right and left is formed on the lower insulating layer 14_1; a pair of electrode layers 13 in right and left is formed at regular intervals on the pair of magnetic wall control layers 12 in right and left and both right and left edge portions of the magnetoresistive effect element 11; and an upper insulating layer 14_2 and an upper shield layer 15_2 are sequentially formed on the pair of electrode layers 13 in right and left and the magnetoresistive effect element 11 of which a surface appears between both right and left edge portions of the pair of electrode layers 13 in right and left.

According to the first conventional magnetic head 20, similar to the magnetic head 10 of the present embodiment, the magnetoresistive effect element 11 is flat extending over the whole surface of both the top surface and the bottom surface and has no difference in level. Further, according to the first conventional magnetic head 20, the pair of electrode layers 13 in right and left defines a core width c2. However, the first conventional magnetic head 20 is different from the magnetic head 10 of the present embodiment in the point that the electrode layers 13 are in contact with the upper surface of the magnetoresistive effect element 11. This feature makes it difficult that a current of the electrode layers 13 efficiently conducts via the antiferromagnetic layer, which is large in specific resistance, into a free magnetic layer, a non-magnetic metal layer and a fixed magnetic layer. Thus, the first conventional magnetic head 20 compares unfavorably with the magnetic head 10 of the present embodiment in the reproduced output because of such an inefficient current conduction.

FIG. 5 is a sectional schematic representation of a second conventional magnetic head.

A second conventional magnetic head 20 is one wherein a lower shield layer 25_1, which is flat extending over the whole surface of both the top surface and the bottom surface and has no difference in level, and a lower insulating layer 24_1, which is flat extending over the whole surface of both the top surface and the bottom surface and has no difference in level, are sequentially formed on a non-magnetic substrate 6; a pair of electrode layers 23 in right and left is formed at regular intervals on the lower insulating layer 24_1 in an in-plane direction of the lower insulating layer 24_1; a magnetoresistive effect element 21 is formed in such a manner that a free magnetic layer is placed under, and at the center portion, it is in contact with a portion that is not covered by the pair of electrode layers 23 of the upper surface of the lower insulating layer 24_1, and on the both end portions, they are in contact with the pair of electrode layers 23; a pair of magnetic wall control layers 22 in right and left interposing the magnetoresistive effect element 21 from both sides of right and left is formed on the pair of electrode layers 23; and an upper insulating layer 24_2 and an upper shield layer 25_2 are sequentially formed on the magnetoresistive effect element 21 and the pair of magnetic wall control layers 22 in right and left.

According to the second conventional magnetic head 30, similar to the magnetic head 10 of the present embodiment, there is provided a pair of electrode layers 23 under the magnetoresistive effect element 21. The pair of electrode layers 23 defines a core width c3. However, the second conventional magnetic head 30 is different from the magnetic head 10 of the present embodiment in the point that since there is a difference in level between the upper surface of the electrode layers 23 and the upper surface of the lower insulating layer 24_1, a difference in level occurs on the magnetoresistive effect element 21, and as a result, a difference in level also occurs on the free magnetic layer (not illustrated) of the magnetoresistive effect element 21. Existence of the difference in level on the free magnetic layer causes a magnetic wall to be generated in the vicinity of the difference in level. While the magnetic wall control layers 22 are in contact with both edge portions of the magnetoresistive effect element 21, it is located apart from a portion of the difference in level and thus it is difficult to sufficiently suppress a movement of the magnetic wall on the difference in level. Accordingly, in the second conventional magnetic head 30, Barkhausen noise will be easily generated on the reproduction signal when the magnetic field is detected.

To the contrary, according to the magnetic head 10 of the present embodiment, the above-mentioned defects of the first conventional magnetic head 20 and the second conventional magnetic head 30 are improved. That is, according to the magnetic head 10 of the present embodiment, while the electrode layers 3 are in contact with the magnetoresistive effect element 1, the magnetoresistive effect element 1 has no difference in level extending over the whole surface of the upper and lower surfaces. The magnetic head 10 of the present embodiment has such a structure, and thus there is provided a magnetic head capable of generating a high output and suppressing a generation of Barkhausen noise on the regeneration signal.

Hereinafter, there will be described manufacturing processes of the magnetic head 10 of the present embodiment.

FIGS. 6–13 are views useful for understanding manufacturing processes of the magnetic head of the embodiment of the present invention.

Figure 6:
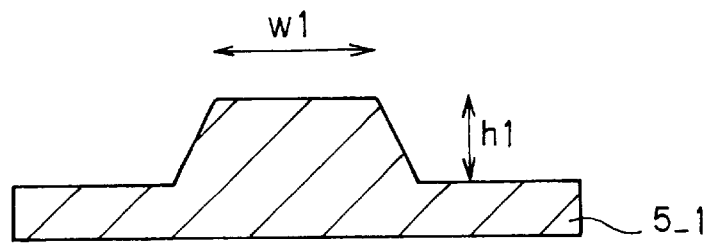
FIGS. 6–13 are views useful for understanding manufacturing processes of the magnetic head of the embodiment of the present invention.

First, a layer consisting of FeZrN is formed by 2 $\mu$m in form of a film on a substrate (not illustrated). Next, as shown in FIG. 6, such a layer is subjected to etching using an ion etching process to form a hill portion in which a height of the surface rises by 5500 Å in difference h1 in level over 1 $\mu$m in width w1. The layer, in which the hill portion is formed, is the lower shield layer 5_1 that is also shown in FIG. 2.

Figure 7:
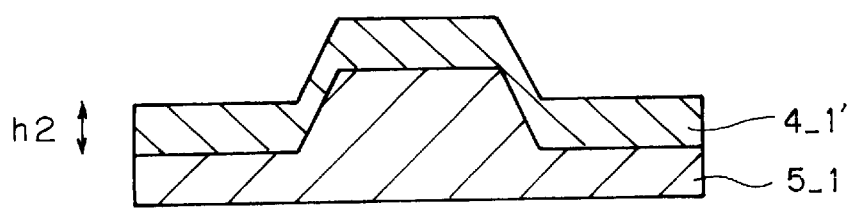

As shown in FIG. 7, a lower insulating layer 4_1' consisting of $Al_2O_3$ is formed on the lower shield layer 5_1 in form of a film having a thickness h2 of 3000 Å that is smaller than the difference hi. This lower insulating layer 4_1' also has a portion of which the center rises in accordance with the hill of the lower shield layer 5_1.

Figure 8:
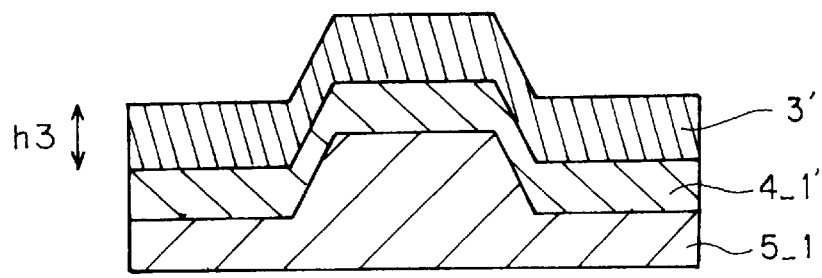

As shown in FIG. 8, an electrode layers 3' consisting of Au is formed on the lower insulating layer 4_1' in form of a film having a thickness h3 of 3500 Å This electrode layers 3' also has a portion of which the center rises in accordance with the hill of the lower shield layer 5_1. The sum of the thickness h3 and the thickness h2 is larger than the difference h1, and a height of the upper surface of a portion out of the rising portion of the center of the electrode layers 3' is higher than the hill of the lower shield layer 5_1.

Figure 9:
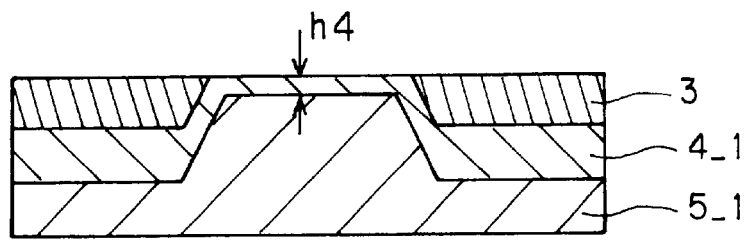

The electrode layers 3' and the lower insulating layer 4_1' are polished and smoothed to form a lower insulating layer 4_1 having a thickness h4 of 400 Å to 600 Å at the pair of electrode layers 3 and the center portion as shown in FIG. 9. The upper surface of the lower insulating layer 4_1 and the upper surface of the electrode layers 3 have the same height owing to the smoothing. In the lower insulating layer 4_1, the thickness h2 of both the edge portions is 3000 Å, while the thickness h2 of the center portion is 400 Å to 600 Å. The upper surfaces of the smoothed lower insulating layer 4_1 and the electrode layers 3 are subjected to a cleaning by the ion milling, so that contaminant can be removed.

Figure 10:
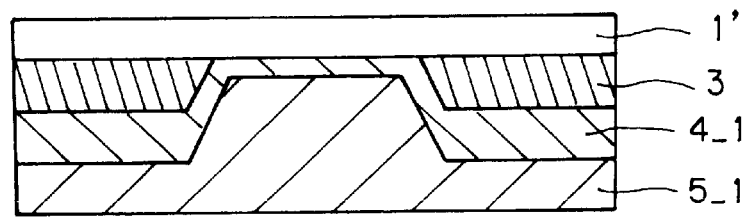

As shown in FIG. 10, a magnetoresistive effect element 1' is formed on both the surfaces of the upper surface of the center portion of the lower insulating layer 4_1 and the upper surface of the pair of electrode layers 3 in right and left, which have the same height. The magnetoresistive effect element 1' is a multi-layer film, and is formed in such a manner that three layers of a layer (50 Å) consisting of Ta, a layer (20 Å) consisting of NiFe and a layer (15 Å) consisting of CoFeB, which constitute a free magnetic layer, are formed in form of a film in the named order from the bottom, and further, a non-magnetic metal layer (30 Å) consisting of Cu, a fixed magnetic layer (20 Å) consisting of CoFeB, an anti-ferromagnetic layer (200 Å) consisting of PdPtMn and a capping layer (60 Å) consisting of Ta are formed in form of a film in the named order on the free magnetic layer. Incidentally, of the three layers constituting the free magnetic layer, the layer consisting of Ta is introduced for the purpose of improvement of the soft magnetic characteristics of the layer consisting of NiFe and the layer consisting of CoFeB.

Figure 11:
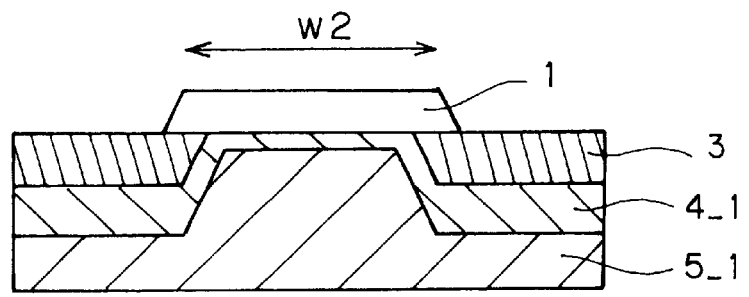

The magnetoresistive effect element 1' is subjected to the ion milling in which a photo resist is applied onto the center portion of the magnetoresistive effect element 1', so that only the center portion is remained and both the edge portions are removed, and as shown in FIG. 11, a magnetoresistive effect element 1 having a finite width w2 of 2 $\mu$m extending left and right is formed. A size of the finite width w2 is set up in such a manner that the magnetoresistive effect element 1 interposes the lower insulating layer 4_1 and overlaps with the pair of electrode layers in right and left.

Figure 12:
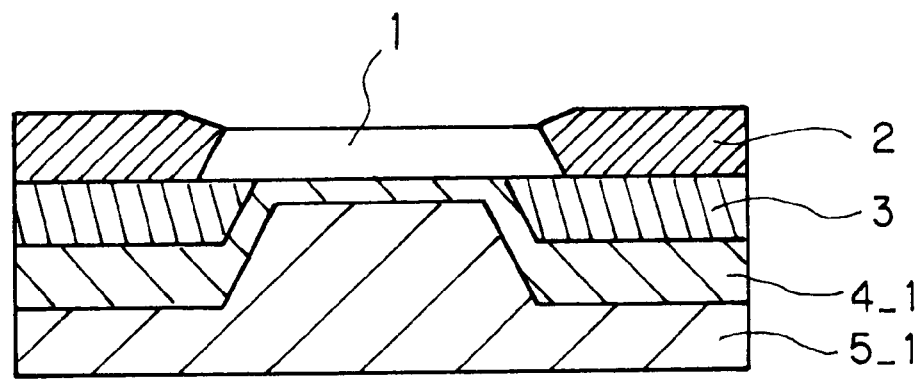

After a layer consisting of CoPt is formed in form of a film of 300 Å retaining the photo resist used for forming the magnetoresistive effect element 1 on the magnetoresistive effect element 1, the photo resist is removed, that is, a lift-off process by a so-called self-alignment is used, as shown in FIG. 12, to form a pair of magnetic wall control layers 2 in right and left extending interposing the magnetoresistive effect element 1 therebetween.

Figure 13:
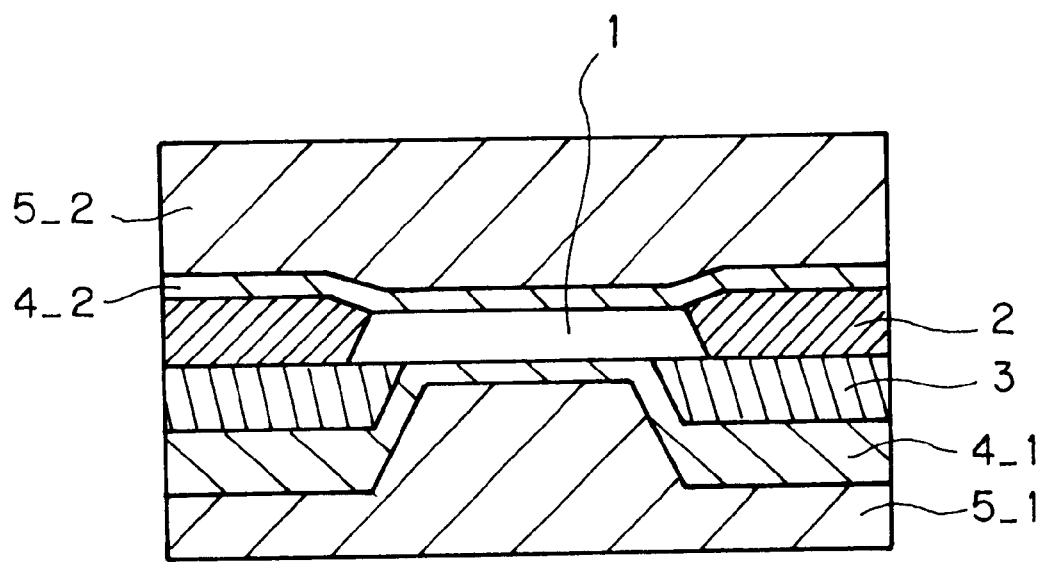

Finally, an upper insulating layer 4_2 consisting of $Al_2O_3$ is formed in form of a film of 500 Å on the magnetoresistive effect element 1 and the pair of magnetic wall control layers in right and left. Then, an upper shield layer 5_2 consisting of NiFe is formed in form of a film of 2 $\mu$m, and as shown in FIG. 13, the magnetic head 10 of the present embodiment is formed.

In accordance with the manufacturing method as mentioned above, there is formed a magnetic head 10 comprising a magnetoresistive effect element 1 free from the difference in level and flat extending over the whole surface although the pair of magnetic wall control layers in right and left overlaps with the lower edge portions, and a lower insulating layer 4_1 of which thickness is thin at the center portion and is thick at both the edge portions.

What is claimed is:

1. A magnetoresistive effect type of head having a magnetoresistive effect element offering a resistive change according to intensity of an external magnetic field, for detecting a magnitude of a resistance of the magnetoresistive effect element to detect intensity of a magnetic field, wherein said magnetoresistive effect element consists of a flat multi-layer film in which a free magnetic layer changing in a direction of a magnetization in accordance with the external magnetic field is set up to a lowest layer, and said magnetoresistive effect type of head comprises:
  a non-magnetic substrate;
  an insulating layer contacting a center portion of a lower surface at a substrate side of said free magnetic layer;
  a pair of electrode layers for conducting a current through said magnetoresistive effect element, said pair of electrode layers being formed at a position interposing said insulating layer therebetween contacting both edge portions of the lower surface at the substrate side of said free magnetic layer, and being formed with a same surface height as a surface height of said insulating layer; and
  a pair of magnetic wall control layers for suppressing a movement of a magnetic wall of said free magnetic layer, said pair of magnetic wall control layers being formed to extend interposing said magnetoresistive effect element therebetween.

2. A magnetoresistive effect type of head according to claim 1, wherein the insulating layer contacting the center portion of the lower surface of said free magnetic layer is an insulating layer which further extends below said pair of electrode layers, and
  said insulating layer is formed in such a manner that thickness of a layer of a portion extending to the center portion of the lower surface of said free magnetic layer, of said insulating layer is thinner than thickness of a layer of a portion extending below said pair of electrode layers, of said insulating layer.

3. A magnetoresistive effect type of head according to claim 1, wherein said pair of electrode layers consists of a material including at least one of Gold (Au) and Copper (Cu).

4. An information-reproducing system having a magnetic head disposed close to or in contact with a magnetic storage medium storing information by magnetization for detecting the magnetization of respective points of the magnetic storage medium, said information-reproducing system reproducing information according to the magnetization of respective points of the magnetic storage medium detected by said magnetic head, which included a magnetoresistive effect element,
  wherein said magnetoresistive effect element consists of a flat multi-layer film in which a free magnetic layer changing in a direction of a magnetization in accordance with the external magnetic field is set up to a lowest layer, and
said magnetic head comprises:
  a non-magnetic substrate;
  an insulating layer contacting a center portion of a lower surface at a substrate side of said free magnetic layer;
  a pair of electrode layers for conducting a current through said magnetoresistive effect element, said pair of electrode layers being formed at a position interposing said insulating layer therebetween contacting both edge portions of the lower surface at the substrate side of said free magnetic layer, and being formed with a same surface height as a surface height of said insulating layer; and
  a pair of magnetic wall control layers extending interposing said magnetoresistive effect element therebetween.

* * * * *